(12) United States Patent
Kramer et al.

(10) Patent No.: US 6,446,421 B1
(45) Date of Patent: Sep. 10, 2002

(54) MANUALLY GUIDED IMPLEMENT, HAVING VIBRATION-DAMPENED HANDLE

(75) Inventors: Jochen Kramer, Waiblingen; Andreas Ehrmann, Auenwald; Heinz Hettmann, Schorndorf; Andreas Schneider, Weinstadt, all of (DE)

(73) Assignee: Firma Andreas Stihl AG & Co. (DE)

( * ) Notice: Subject to any disclaimer, the term of this patent is extended or adjusted under 35 U.S.C. 154(b) by 0 days.

(21) Appl. No.: 09/586,414

(22) Filed: Jun. 1, 2000

(30) Foreign Application Priority Data

Jun. 2, 1999 (DE) .......................... 199 25 281

(51) Int. Cl.⁷ ................................ A01G 3/04
(52) U.S. Cl. .......................... 56/233; 30/381
(58) Field of Search ............ 56/233, 237, 239, 56/289, 10.5, 12–7; 30/210, 231, 211, 233, 216, 290, 296.1, 381; D8/65

(56) References Cited

U.S. PATENT DOCUMENTS

| | | | | |
|---|---|---|---|---|
| 3,140,746 A | * | 7/1964 | Force ...................... 173/162.1 |
| 3,542,095 A | * | 11/1970 | Frederickson ................ 143/32 |
| 3,637,029 A | * | 1/1972 | Sherwood, Jr. et al. ...... 173/162 |
| 3,652,074 A | * | 3/1972 | Frederickson et al. ....... 267/137 |
| 4,141,143 A | * | 2/1979 | Hirschkoff et al. ........... 30/381 |
| 4,785,539 A | * | 11/1988 | Nagashima ................... 30/381 |
| 5,046,566 A | * | 9/1991 | Dorner et al. ........ 173/162.002 |
| 5,212,886 A | * | 5/1993 | Tasaki ......................... 30/381 |
| D344,088 S | * | 2/1994 | Tuggle et al. .................. D15/1 |
| 5,368,107 A | * | 11/1994 | Taomo .................... 173/162.2 |
| 5,447,295 A | * | 9/1995 | Taomo ........................ 267/153 |
| D364,326 S | * | 11/1995 | Lohse et al. .................... D8/65 |
| D377,441 S | * | 1/1997 | Hoppner et al. ................ D8/65 |
| D386,958 S | * | 12/1997 | Karlsson et al. ............... D8/65 |
| 6,232,672 B1 | * | 5/2001 | Leufen et al. .............. 290/1 A |

FOREIGN PATENT DOCUMENTS

| | | | | |
|---|---|---|---|---|
| DE | 2525116 | * | 7/1976 | ........... B27B/17/02 |
| DE | 2651231 | * | 5/1978 | ........... A01G/3/04 |
| DE | 3343772 | * | 6/1985 | ........... A01G/3/04 |
| DE | 3531059 | * | 3/1987 | ............. F16P/3/12 |
| DE | 19953914 | * | 5/2000 | ............. B25F/3/00 |
| EP | 469757 | * | 2/1992 | ........... A01G/3/04 |

* cited by examiner

Primary Examiner—Robert E. Pezzuto
Assistant Examiner—Árpád Fábián Kovács
(74) Attorney, Agent, or Firm—R W Becker & Associates; R W Becker

(57) ABSTRACT

A hedge trimmer has a tool that is driven by a drive unit. At least one vibration-dampened handle is secured to the drive unit. The handle comprises a one-piece component having a grip portion and a mounting portion for mounting on the drive unit. To simplify mounting of the handle, the grip portion and the mounting portion are interconnected by a vibration-dampening intermediate portion. The mounting portion along with the intermediate portion and the grip portion form the one-piece or monolithic component.

12 Claims, 4 Drawing Sheets

MANUALLY GUIDED IMPLEMENT, HAVING VIBRATION-DAMPENED HANDLE

BACKGROUND OF THE INVENTION

The present invention relates to a manually guided implement, especially a hedge trimmer, a power chain saw, a cut-off saw, or the like, comprising a drive unit and a tool driven by the drive unit.

DE 26 51 231 A1 discloses an implement of the aforementioned type that is embodied as a hedge trimmer. A rear handle that is oriented in the longitudinal direction of the hedge trimmer is secured to the drive unit. In addition, a front handle that is disposed transverse to the longitudinal axis is secured between the cutter bar and the drive unit. Each of the handles comprises a mounting portion and a grip portion that is embodied as a one-piece, rigid component. Since the mounting portion is mounted directly to the drive unit, all vibrations of the drive unit are transferred in an undampened manner to the mounting portion and hence act upon an operator's hand. This interferes with a fatigue-free operation over a longer period of time.

DE 25 25 116 A1 discloses a portable, manually guided implement, namely a power chain saw, which also has a rear handle oriented in the longitudinal direction of the implement as well as a front handle that is disposed transverse to the longitudinal direction. The handles comprise a grip portion and a mounting portion that are respectively fixed in position on the housing of the drive unit via anti-vibrational elements. As a consequence of the arrangement of the anti-vibrational elements, the vibrations of the drive motor, which is embodied as an internal combustion engine, are dampened, so that the grip portions are essentially kept free of vibrations. Such an implement having vibration-dampened handles permits a fatigue-free operation even over longer periods of time.

It should be noted, however, that the arrangement of anti-vibrational elements between the mounting portions of a handle and the drive unit is complex with respect to the number of parts required and must therefore be embodied in such a way that a direct contact of the mounting portion of a handle with the vibration-inducing component is reliably avoided.

It is an object of the present invention to improve an implement of the aforementioned general type in such a way that, using only a few parts, an easy to mount, vibration-dampened handle is provided.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

Figure 1:
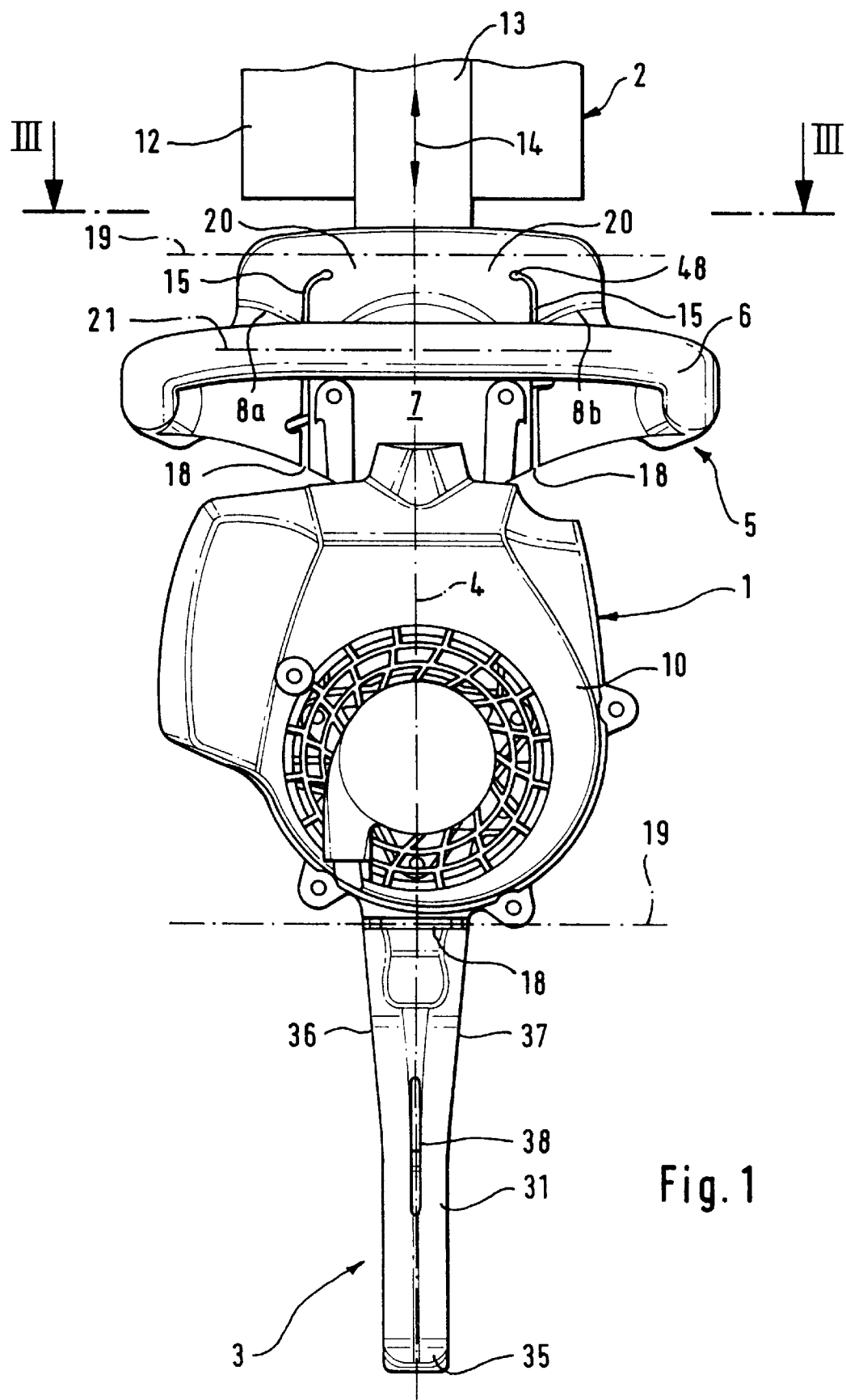
FIG. 1 is a top view of one exemplary embodiment of an inventive portable, manually guided implement, in this case a hedge trimmer.

The implement of the present invention has at least one vibration-dampened handle for carrying and/or guiding the implement, wherein such handle is mounted on the drive unit and comprises a monolithic component that has a grip portion and a mounting portion for mounting on the drive unit; the grip portion and the mounting portion are interconnected by a vibration-dampening intermediate portion, wherein the mounting portion along with the intermediate portion and the grip portion form the monolithic component.

The arrangement of a vibration-dampening intermediate portion between the mounting portion and the grip portion of the handle ensures a vibrational uncoupling of the grip portion from the vibration-inducing mounting portion. Since the mounting portion, the intermediate portion and the grip portion together form a monolithic component, it is possible with the present invention and by providing only a few parts to have a straightforward and error-free mounting on the drive unit of the implement. The mounting portion needs merely to be securely connected to the drive unit, for example by being securely screwed or bolted thereto. As a consequence of the vibration-dampening intermediate portion that is disposed between the mounting portion and the grip portion, the vibration-dampening is ensured even if an error occurs during mounting of the mounting portion.

In a straightforward manner, the embodiment of a vibration-dampening intermediate portion is effected by a separating slot that is open at one end and that is disposed between the intermediate portion and the mounting portion. In this way, the intermediate portion receives an elongated flat spring-like shape and in the context of material properties can be elastically deformed. Despite the one-piece configuration comprising the mounting portion, the intermediate portion and the grip portion, due to the presence of the separating slot the intermediate portion receives vibration-dampening characteristics that ensure an uncoupling or neutralization of the vibration between the mounting portion and the grip portion.

Practice has shown that the dampening characteristics of the inventive structural configuration of the handle to comprise a mounting portion, a vibration-dampening intermediate portion and a grip portion can be further improved if the open end of the separating slot is spanned by a dampening element. In this way, a recoupling of the vibrationally uncoupled end of the intermediate portion with the vibration-inducing mounting is achieved, whereby the dampening element that spans the separating slot acts parallel to the vibration-dampening intermediate portion. This combination achieves good dampening characteristics accompanied by a high guidance quality. The implement can be precisely handled and guided over a long period of operation without becoming tired.

The dampening element is expediently formed by a spring, preferably a coil spring, whereby one end of the spring is to be fixed in position on the mounting portion and the other end of the spring is to be fixed in position on the intermediate portion. The coil spring is arranged by means of a mounting dome in such a way that its longitudinal axis is disposed essentially perpendicular to the plane of the intermediate portion.

If the grip portion and the intermediate portion, preferably together with the mounting portion, form a closed grip frame, an inherently stable handle thereby results.

Pursuant to one particular specific embodiment of the present invention, each end of the grip portion is connected by an intermediate portion with a common mounting portion. This configuration is particularly expedient for the front handle that is disposed transverse to the longitudinal axis of the implement, whereby the vibration-dampening intermediate portions are disposed symmetrically relative to the longitudinal central axis of the implement. Thus, when looking upon the implement from above, there is disposed on each longitudinal side of the longitudinal central axis of the implement an intermediate portion that extends approximately parallel to the longitudinal central axis, so that the grip portion that is held by the intermediate portions can be elastically shifted not only in the longitudinal direction of the longitudinal central axis of the implement, but can also be elastically rotated about the longitudinal central axis. As a consequence of this symmetrical arrangement, it is in particular easy to mount the front handle of an implement that is disposed transverse to the longitudinal central axis in a vibration-dampened manner.

Further specific features of the present invention will be described in detail subsequently.

DESCRIPTION OF PREFERRED EMBODIMENTS

Figure 2:
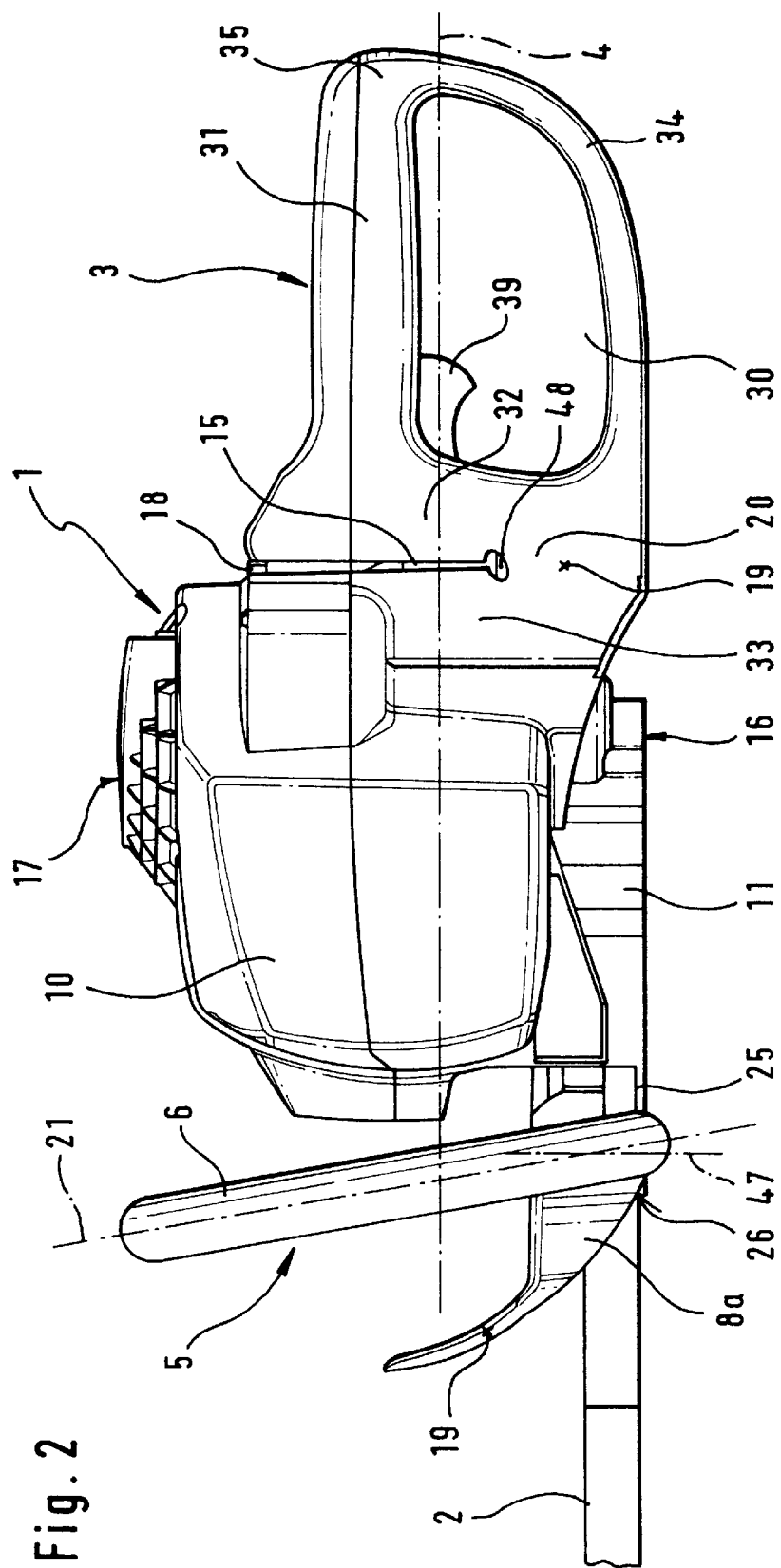
FIG. 2 is a side view of the implement of FIG. 1.

Referring now to the drawings in detail, the manually guided implement illustrated in FIGS. 1 and 2 is a hedge trimmer and essentially comprises a drive unit 1 that drives a tool 2 in a suitable manner. In the illustrated embodiment, the drive unit 1 includes an internal combustion engine that is disposed in a housing 10 and that via a gear mechanism 11 (FIG. 2) drives the tool 2, which is embodied as a cutter bar. In a manner known per se, this cutter bar comprises schematically illustrated blades 12 that are driven back and forth between guide bars 13 in the direction of the double arrow 14.

The implement, which is embodied as a hedge trimmer, is provided with a rear handle 3 that is embodied as a longitudinal handle and is secured to the housing 10 of the drive unit 1 approximately along the longitudinal central axis 4 of the implement.

As can be seen from FIG. 2, the rear handle 3 comprises a grip portion 31 that is connected via an intermediate portion 32 with a mounting portion 33 that is rigidly secured to the housing 10 of the drive unit 1. The rear end 35 of the grip portion 31 is connected via a connecting portion 34 with the intermediate portion 33, i.e. the mounting portion 33, as a result of which the grip portion 31, the intermediate portion 32, a part of the mounting portion 33, and the connecting portion 34 form a closed grip frame 30. Together with the mounting portion 33, this grip frame 30 is produced as a single component, preferably being made of plastic.

A separating slot 15, that extends approximately transverse to the longitudinal central axis 4, is formed between the mounting portion 33 and the intermediate portion 32. When viewed in the side view of FIG. 2, the separating slot 15 is disposed between the housing 10 of the drive unit 1, i.e. the mounting portion 33, and the intermediate portion 32; when viewed from the side of the implement, the separating slot 15 extends approximately vertically from the underside 16 thereof to the upperside 17. That end 18 of the separating slot 15 that faces the upperside 17 is open, so that the handle 3 is elastically moveable about an imaginary axis 19. This axis 19 is disposed approximately in the extension of the separating slot 15 in the connection region 20 of the intermediate portion 32 to the mounting portion 33. The mounting portion 33, the connection region 20, and the intermediate portion 32 are disposed approximately in a single plane.

Although the mounting portion 33, the intermediate portion 32 and the grip portion 31 form a common, one-piece component, and in particular a monolithic component, and due to the arrangement of the separating slot 15 between the mounting portion 33 and the intermediate portion 32, a relative movement is possible about the axis 19 that is disposed in the connection region 20, as a consequence of which a neutralization of vibration is achieved. Especially with internal combustion engines (two-stroke engines, four-stroke engines, or the like), a sufficient dampening of vibration is achieved due to the separating slot 15, so that an operator's hand that is grasping the grip portion 31 is subjected to only slight vibrational stresses.

As can be seen in particular in the top view of FIG. 1, the separating slot 15 extends from one longitudinal side 36 to the other longitudinal side 37 of the handle 3. As furthermore shown in FIG. 1, disposed on the upperside of the grip portion 31, opposite the connecting portion 34, is a throttle stop 38 that cooperates with a gas throttle 39 that is disposed within the grip frame 30. The internal combustion engine that is disposed in the housing 10 is controlled by the throttle 39.

Figure 3:
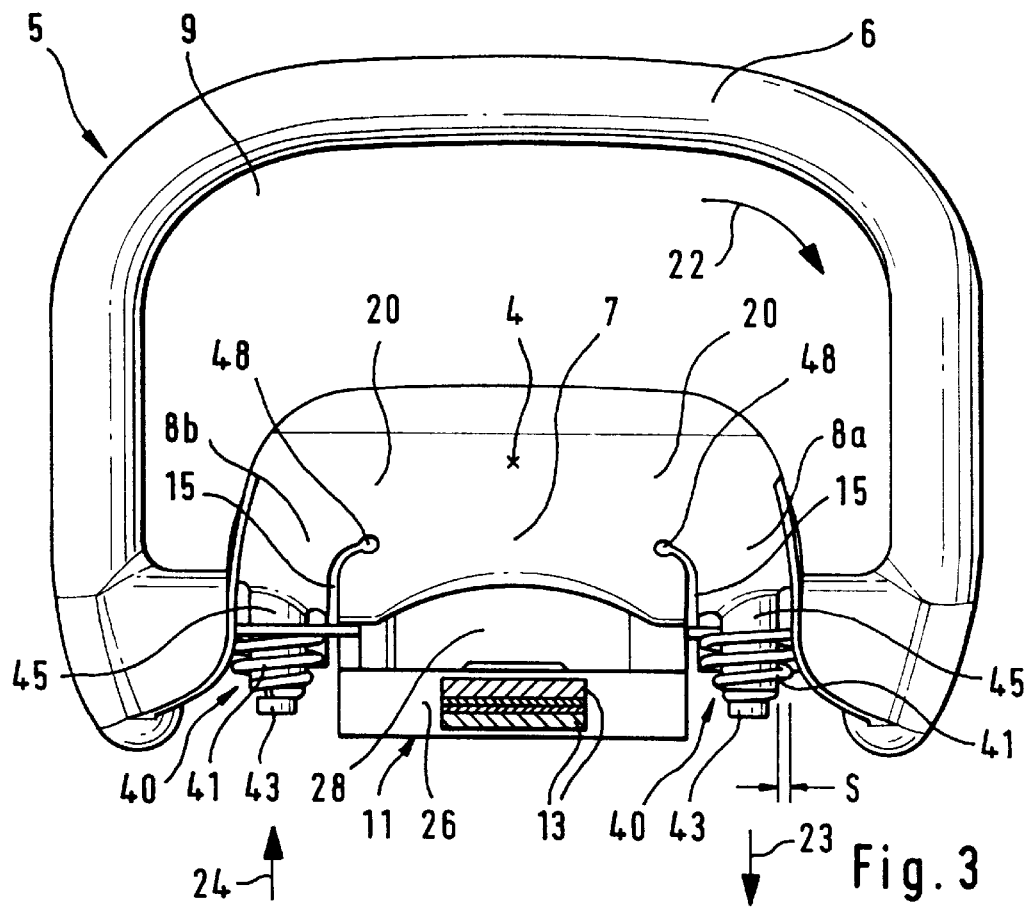
FIG. 3 is a view of the front handle of the implement taken along the line III—III in FIG. 1.
Figure 5:
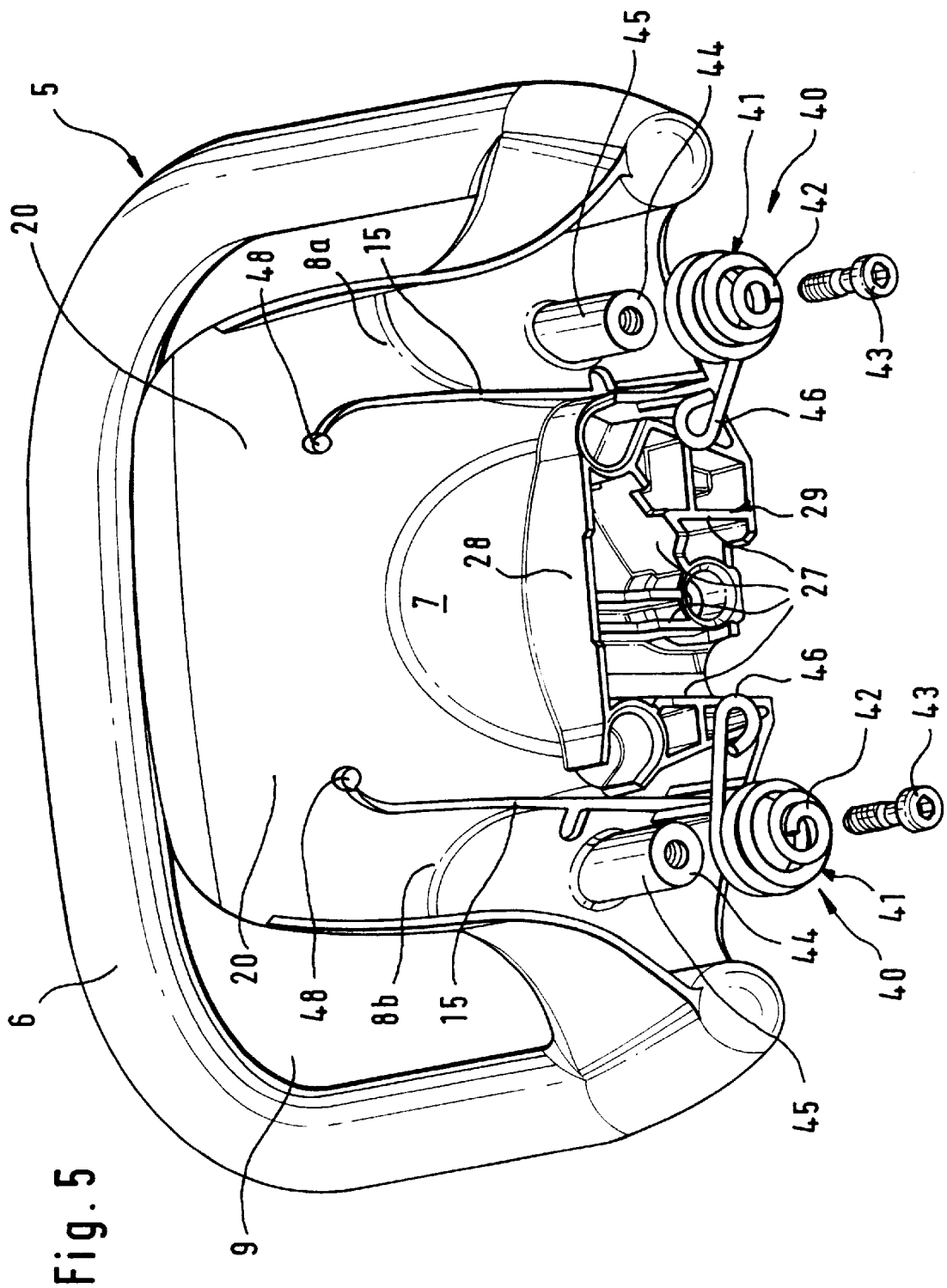
FIG. 5 is a perspective view of the front handle with the dampening elements for spanning the separating slots and for mounting on mounting domes.

Disposed between the working tool 2, which is embodied as a cutter bar, and the drive unit 1 is the front handle 5, which, as can be seen in particular from FIGS. 1, 3 and 5, is also embodied as a closed grip frame 9. This grip frame comprises an approximately U-shaped, yoke-like grip portion 6, each end of which is connected to an intermediate portion 8a or 8b. These intermediate portions are connected to a common mounting portion 7 via respective connection regions 20; the intermediate portions 8a and 8b, as well as the mounting portion 7, close off the U-shaped grip portion 6. The arrangement of the mounting portion 7 and the intermediate portions 8a and 8b is such that they are raised out of the plane 21 that is determined by the U-shaped grip portion 6, as can be seen in particular in the side view of FIG. 2. The mounting portion 7 and the intermediate portions 8a and 8b extend essentially on that side of the plane 21 that faces the cutter bar 2, with the sections 7, 8a and 8b at the same time forming an end protection for that hand of the operator that grips the front handle 5. The mounting portion 7 and the intermediate portions 8a and 8b appropriately extend in a slightly curved manner in a direction toward the upper region of the grip portion 6.

As shown in FIGS. 1 and 3 to 5, the mounting portion 7 is disposed between the intermediate portions 8a and 8b, with the connection regions 20 facing the cutter bar 2.

The mounting portion 7, the intermediate portions 8a and 8b, as well as the grip portion 6 form a component that is monolithically interconnected, whereby each intermediate portion 8a and 8b is separated from the mounting portion 7 disposed between them by a separating slot 15 up to the connection region 20. The mounting portion 7 and the intermediate portions 8a and 8b are disposed approximately in a single plane, whereby the open end 18 of the separating slot 15 in each case faces the housing 10 of the drive unit 1. As shown in FIG. 1, the separating slots 15 each end adjacent to the wall of the housing 10 of the drive unit 1.

Despite the fact that the front handle 5, which is disposed transverse to the longitudinal central axis 4 of the implement, is embodied as a one-piece or a monolithic component, the grip portion 6 is elastically moveable relative to the mounting portion 7. As can be seen from the top view of FIG. 1, those ends of the flat spring-like intermediate portions 8a and 8b that face the grip portion 6 adjoin the mounting portion 7 merely via the connection region 20. As a consequence, there results in the connection region 20 an imaginary pivot axis 19 that is disposed transverse to the longitudinal central axis 4; the grip portion 6 can move elastically relative to the mounting portion 7 about the pivot axis 19. At the same time, however, the grip portion 6 is also elastically rotatable about the longitudinal central axis 4, which is achieved due to the arrangement of the intermediate portions 8a and 8b on opposite sides of the axis 4. As schematically illustrated in FIG. 3, an elastic rotational movement about the longitudinal axis 4 in the direction of the arrow 22 is possible because the intermediate portion 8a can shift elastically downwardly in the direction of the arrow 23 and the intermediate portion 8b can shift elastically upwardly in the direction of the arrow 24. A similar situation exists for an elastic rotational movement of the grip portion 6 in a direction opposite the arrow 22.

By producing the monolithic component that comprises the mounting portion 7, the intermediate portions 8a and 8b, as well as the grip portion 6 from plastic, a good vibrational uncoupling of the grip portion 6 from the mounting portion 7 that is rigidly fixed on the drive unit 1 can be achieved.

A further improvement of the vibrational uncoupling while maintaining a good guidance quality can be achieved in that the separating slot 15, in the region of its open end 18, is spanned by a dampening element 40. This recouples the uncoupled ends of the intermediate portion 8a or 8b and the mounting portion 7. In practice it has been established that very good dampening values can be achieved if the dampening element 40 is embodied as a spring, preferably a coil spring 41. For this purpose, the coil spring 41 is expediently placed upon a mounting dome, with the windings of the coil spring having a radial play S therefrom (see FIG. 3). The one end 42 of the spring is bent spirally inwardly and by means of a screw 43 is fixed in position on the free end 44 of the mounting dome 45. The other end 46 of the spring extends in the manner of a looped leg over the separating slot 15 and is fixed to the mounting portion 7 via a fastening screw. The spring end 46 is expediently fixed in position via a fastening screw 47 (FIG. 4) by means of which the mounting portion 7 is secured to a bracket or collar 25 (FIG. 2) of the housing of the gear mechanism 11. The cutter bar 2 extends from the housing of the gear mechanism 11 toward the front in the direction of the longitudinal central axis 4 of the implement.

The mounting dome 45 is provided on that side of the intermediate portion 8a or 8b that faces the grip portion 6. The mounting domes 45 are disposed approximately at the level of the front end face 26 of the housing of the gear mechanism 11.

Figure 4:
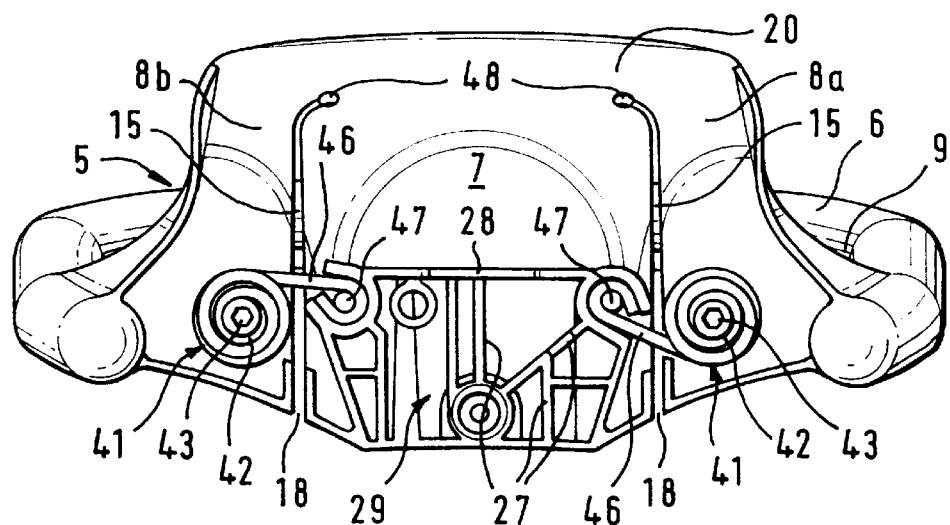
FIG. 4 is a view of the front handle from below.

FIG. 4 illustrates a wall element 28 that is approximately flush with the end face 26 and that, along with other elements 27, reinforces the abutment surface 29 of the mounting portion 7 upon the bracket or collar 25.

As can also be seen from FIGS. 4 and 5, the closed ends of the separating slots 15 extend slightly toward one another. The separating slots end in bores 48 in order to reduce stress peaks in material, especially of plastic.

The specification incorporates by reference the disclosure of German priority document 199 25 281.5 of Jun. 2 1999.

The present invention is, of course, in no way restricted to the specific disclosure of the specification and drawings, but also encompasses any modifications within the scope of the appended claims.

What we claim is:

1. A manually guided implement comprising a drive unit and a tool driven by the drive unit, said implement further comprising:

at least one vibration-dampened handle for carrying or guiding said implement, wherein said at least one handle is mounted directly on said drive unit with no intermediate dampening elements between the at least one handle and the drive unit and comprises a monolithic component that has a grip portion and a mounting portion for mounting on said drive unit, wherein said grip portion and said mounting portion are interconnected by an elastic vibration-dampening intermediate portion, wherein said mounting portion along with said intermediate portion and said grip portion form said monolithic component, and wherein a separating slot which is open at one end is provided in said monolithic component for separating from one another said intermediate portion and said mounting portion over at least part of the length thereof.

2. An implement according to claim 1, which includes a dampening element that spans said separating slot in the vicinity of said open end thereof.

3. An implement according to claim 2, wherein said dampening element is a spring, preferably a coil spring, wherein one end of said spring is fixed in position on said mounting portion, and wherein the other end of said spring is fixed in position on said intermediate portion.

4. An implement according to claim 3, wherein said coil spring extends over a mounting dome, wherein said other end of said spring is bent spirally inwardly and is preferably fixed in position over a free end of said mounting dome, and wherein said one end of said spring spans said separating slot.

5. An implement according to claim 4, wherein said mounting dome is provided such that it extends approximately perpendicularly on said intermediate portion, and in particular on a side of said intermediate portion that faces away from said grip portion.

6. An implement according to claim 1, wherein said mounting portion and said intermediate portion are disposed approximately in a single plane.

7. An implement according to claim 1, wherein said grip portion and said intermediate portion, preferably together with said mounting portion, form a closed grip frame.

8. An implement according to claim 7, wherein said grip frame is disposed transverse to a longitudinal central axis of said implement and forms a forward handle.

9. An implement according to claim 1, wherein said mounting portion and said intermediate portion project from a plane that is determined by said grip portion, wherein in particular each end of said grip portion is connected via a respective intermediate portion with a common mounting portion, and wherein said mounting portion is preferably disposed between said intermediate portions.

10. An implement according to claim 9, wherein said intermediate portions are disposed on opposite sides of a longitudinal central axis of said implement.

11. An implement according to claim 1, wherein said open end of said separating slot faces said grip portion and preferably also said drive unit.

12. An implement according to claim 1, wherein said at least one handle is made of plastic.

* * * * *